Figure 1:
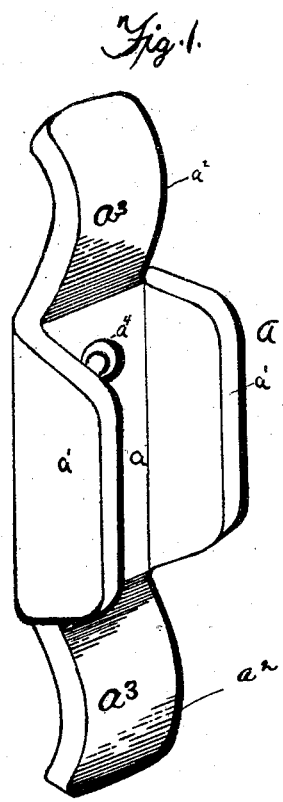

No. 705,061. Patented July 22, 1902.
C. A. FRANCIS.
WAGON BRAKE.
(Application filed Mar. 10, 1902.)

(No Model.)  2 Sheets—Sheet 1.

Witnesses

Inventor.
Charles A. Francis.

No. 705,061. Patented July 22, 1902.
C. A. FRANCIS.
WAGON BRAKE.
(Application filed Mar. 10, 1902.)
(No Model.) 2 Sheets—Sheet 2.
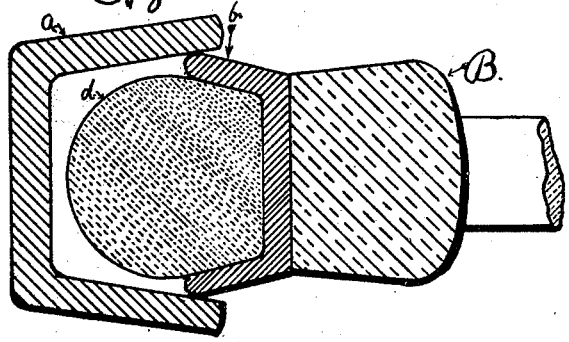
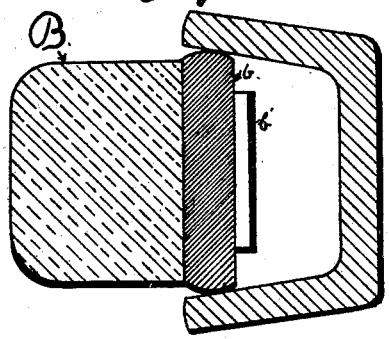
Witnesses.
Inventor.
Charles A. Francis.

UNITED STATES PATENT OFFICE.

CHARLES A. FRANCIS, OF SOUTH BEND, INDIANA.

WAGON-BRAKE.

SPECIFICATION forming part of Letters Patent No. 705,061, dated July 22, 1902.

Application filed March 10, 1902. Serial No. 97,397. (No model.)

*To all whom it may concern:*

Be it known that I, CHARLES A. FRANCIS, a citizen of the United States, residing at South Bend, in the county of St. Joseph and State of Indiana, have invented certain new and useful Improvements in Wagon-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to braking mechanism for vehicles, and has particular relation to the brake block or shoe which contacts with the wheel.

So far as I am aware the braking pressure is in most cases applied on the face of the wheel or tire. In other words, it is applied in a direction radial to the wheel. As a result the operator is compelled to apply excessive power to the brake-lever attempting to form a lock between the brake-shoe and the axle. Another form used consists in providing a clamp for the wheel-rim, the clamping members being brought together on opposite sides of the wheel-rim and in planes parallel with the faces of such sides, thereby when the brake-lever is operated forcing the blocks into direct contact with the sides of the wheel-rim. In this case the wheel is to be held gripped between the two blocks, with a result that a constant and heavy strain is placed on the support for the shoes with a tendency to break the parts. With the latter arrangement the wheel must be either free or firmly gripped, and consequently the strain is sudden, with a liability of the parts breaking.

In the present invention the wheel rim or tire is gripped at its edges, but with a gradually-increasing pressure and a constant forcing of a gripping action with a minimum amount of power and without a tendency of attempting to force the wheel against the axle-skein to the damage of the latter.

The object, therefore, of my invention is to provide a braking mechanism in which the pressure to be applied is gradually increased simultaneously with a clamping action of the shoe on the sides of the rim or tire.

A further object is to provide a brake-shoe which will clamp the wheel rim or tire on its edges with increasing pressure and without the use of toggle-levers and the like.

Other and further objects will appear as the invention is hereinafter disclosed.

To these and other ends my invention consists in braking mechanism substantially as herein shown and described, and particularly pointed out in the appended claims.

Figure 2:
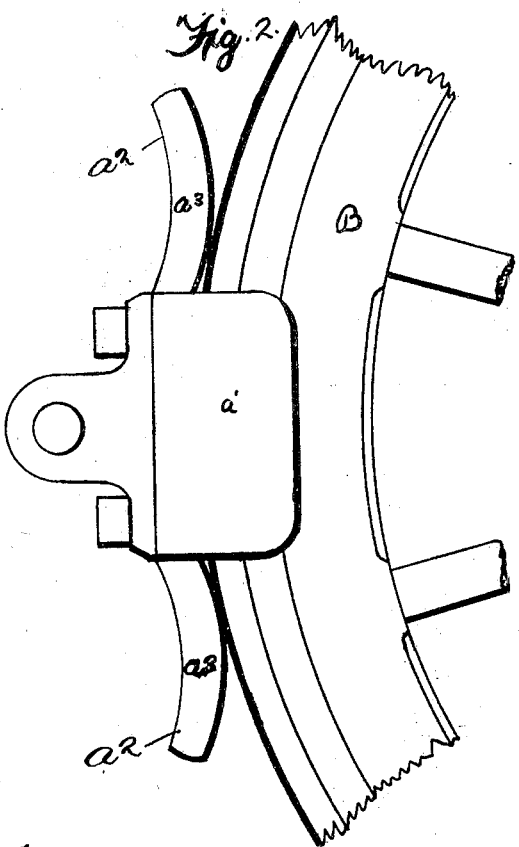
Figure 3:
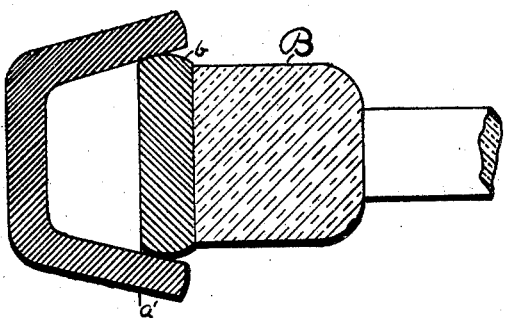

In the accompanying drawings, Figure 1 is a perspective view of a brake-shoe constructed in accordance with my invention. Fig. 2 is a side elevation showing the brake-shoe support, a portion of the wheel, and my improved shoe in position. Fig. 3 is a horizontal sectional view of the brake-shoe and showing it applied to a wheel having the ordinary steel tire. Fig. 4 is a similar view showing the shoe applied to a channel-tire of the usual form. Fig. 5 is a similar view showing the shoe applied to the ordinary steel tire with a snow-sleeve in position on the tire.

My improved brake-shoe is formed, substantially, as shown in Fig. 1 and designated in the drawings as A. Said shoe comprises a fastening-plate $a$ of suitable length and width, from the side edges of which extend flanges $a'$ $a'$, arranged at an angle greater than a right angle to the plate $a$, thereby forming a flared recess between the flanges. The ends of the plate $a'$ extend beyond the flanges and are curved forwardly, as shown at $a^3$, said ends being designated as $a^2$. The shoe is secured in position on the shoe-support in any suitable manner, preferably by bolts, in which case the plate $a$ is preferably provided with countersunk openings $a^4$.

B designates the felly of a wheel, and $b$ the tire therefor. The tire may be the ordinary steel tire or the tire used in connection with a rubber tire, in the latter case the tire $b$ being what is known as "channel-tire." The flanges $a'$ being inclined as shown and spaced relatively to each other are adapted to extend when in use on opposite sides of the wheel-rim, the outer portion of the recess between said flanges being greater than the width of the wheel-tire. It will be readily seen that as pressure is applied by the operator there is first a slight contact between the edges of the tire and the inner faces of the flanges thereby causing a frictional resistance which is increased rapidly by the continued pressure of the operator, causing the flanges to be forced over the edges of the tire a greater distance, and this is due mainly to the fact that the angle at which said flanges extend is sufficient merely to cause the clamping of the flanges with the edges of the tire, such angle being obtained by spacing the flange relative to each other. Were the angle abrupt, the clamping effect would be lost, as the pressure would be applied at the outer edges of the tire, thus reducing the frictional resistance and requiring excessive pressure. There is therefore formed not only the pressure which is applied by the operator, but also a biting or gripping action due to the inclined sides of the flanges, and inasmuch as the application of this gripping action is not, generally speaking, on a stationary wheel, but rather on a body that is moving, the tendency is for the tire to "eat" its way into the flared recess, and thus aiding in locking the wheel without a requirement of excessive application of power. As the flanges are of considerable width, the tire does not pass into the recess a distance sufficient to cause the face of the tire to contact with the face of the plate $a$, thereby leaving a space between the face of the tire and the face of said plate, so that auxiliary appliances, such as a snow-sleeve $b'$, can be used, or if the shoe is to be used in connection with a rubber-tired wheel, in which case a channel-tire is used, the surface of the rubber tire will not contact with the face of the plate $a$, thereby permitting of the use of any special type of tire desirable.

The curved ends $a^2$ of the plate $a$ are provided for the purpose of clearing the tire from extraneous matter.

Having thus described my invention, what I claim as new is—

1. In a braking mechanism for vehicles, a brake-shoe having spaced integral inclined faces located in opposed relation to the wheel being braked and adapted to form a frictional contact with the outer edges of the wheel-tire as pressure is applied, the face of the tire being free from contact with said shoe, the face of said shoe being flat and in parallelism with the face of the wheel.

2. A brake-shoe for vehicles comprising a supporting-plate having spaced integral forwardly-projecting flanges arranged at an angle to the face of said plate, said flanges being located in opposed relation to the wheel being braked, whereby a flared recess of fixed dimensions will be formed between said flanges for the reception of the wheel-tire, the face of the latter being free from contact with the shoe, the face of the said plate being flat and in parallelism with the face of the wheel-rim.

3. A brake-shoe for vehicles comprising a supporting-plate having integral forwardly-projecting flanges arranged at an angle to the face of said plate, as $a'$, whereby a flared recess of fixed dimensions will be formed between said flanges for the reception of the wheel-tire, the ends of said plate projecting beyond the flanges and being curved forwardly, to form clearers for the shoe.

In testimony whereof I affix my signature in presence of two witnesses.

CHAS. A. FRANCIS.

Witnesses:
J. DU SHANE,
M. A. NOISOM.